United States Patent
Kanderski et al.

(10) Patent No.: US 10,081,212 B2
(45) Date of Patent: Sep. 25, 2018

(54) COHESIVELY FAILING, NON-STAINING HOT MELT ADHESIVES

(71) Applicant: Bostik, Inc., Wausatosa, WI (US)

(72) Inventors: Monina D. Kanderski, Milwaukee, WI (US); Michael D. Vitrano, West Allis, WI (US)

(73) Assignee: BOSTIK, INC., Wauwatosa, WI (US)

( * ) Notice: Subject to any disclaimer, the term of this patent is extended or adjusted under 35 U.S.C. 154(b) by 0 days.

(21) Appl. No.: 14/789,727

(22) Filed: Jul. 1, 2015

(65) Prior Publication Data

US 2016/0002508 A1    Jan. 7, 2016

Related U.S. Application Data

(60) Provisional application No. 62/020,760, filed on Jul. 3, 2014.

(51) Int. Cl.
| | |
|---|---|
| *C09J 153/00* | (2006.01) |
| *C09J 153/02* | (2006.01) |
| *B42D 15/04* | (2006.01) |
| *B42D 15/00* | (2006.01) |

(52) U.S. Cl.
CPC ......... *B42D 15/04* (2013.01); *B42D 15/0093* (2013.01); *C09J 153/025* (2013.01)

(58) Field of Classification Search
CPC .................................................. C09J 153/025
See application file for complete search history.

(56) References Cited

U.S. PATENT DOCUMENTS

| | | | |
|---|---|---|---|
| 4,756,468 A * | 7/1988 | Jenkins ................ | B42D 5/025 229/304 |
| 4,770,337 A * | 9/1988 | Leibe ..................... | B42D 5/025 229/301 |
| 5,741,840 A | 4/1998 | Lindquist et al. | |
| 5,912,295 A | 6/1999 | Oeltjen et al. | |
| 6,172,156 B1 | 1/2001 | Lindquist et al. | |
| 6,433,069 B1 | 8/2002 | Oeltjen et al. | |
| 2007/0282072 A1* | 12/2007 | Hoffmann ............. | C09J 123/02 525/240 |
| 2008/0306214 A1 | 12/2008 | Kanderski | |
| 2011/0021103 A1* | 1/2011 | Alper ..................... | B32B 5/26 442/329 |
| 2012/0259050 A1* | 10/2012 | Vitrano .............. | C09J 123/0815 524/293 |
| 2013/0123413 A1* | 5/2013 | Lederer ................... | C08L 23/10 524/451 |
| 2014/0171586 A1* | 6/2014 | Hu ......................... | C09J 123/02 524/576 |

FOREIGN PATENT DOCUMENTS

| | | |
|---|---|---|
| CN | 103562332 A | 4/2012 |
| CN | 102498170 A | 6/2012 |
| WO | 9800471 A1 | 1/1998 |
| WO | 2013101255 A1 | 7/2013 |

OTHER PUBLICATIONS

International Search Report dated Oct. 1, 2015 issued in the corresponding PCT International Application No. PCT/US2015/038883.
International Written Opinion dated Oct. 1, 2015 issued in the corresponding PCT International Apptication No. PCT/US2015/038883.

* cited by examiner

*Primary Examiner* — Jeffrey C Mullis
(74) *Attorney, Agent, or Firm* — Christopher R. Lewis

(57) ABSTRACT

A non-pressure sensitive hot melt adhesive for use in mailer applications uses a styrenic block copolymer (SBC) with a hydrogenated mid-block as the primary polymer in the composition. The adhesive contains about 10% to about 50% by weight of the SBC, about 2% to about 30% by weight of a polyolefin polymer as a secondary polymer in the composition, about 10% to about 70% by weight of a suitable plasticizer, about 0% to about 30% by weight of a wax, about 0% to about 50% by weight of one or more tackifying resins, about 0.1% to about 4% by weight of a stabilizer, and about 0% to about 3% by weight of auxiliary additives, so that the viscosity of the composition is equal to or less than about 10,000 cP at 163° C. The formulation balances the cohesive and adhesive strength required to insure the adhesive fails cohesively to prevent paper tear. In addition, the presence of the secondary polymer allows additional oil absorption into the polymer, thus preventing oil from staining the substrates or surfaces without significantly increasing the viscosity.

23 Claims, No Drawings

COHESIVELY FAILING, NON-STAINING HOT MELT ADHESIVES

FIELD OF THE INVENTION

Hot melt adhesives have been used to temporarily bond surfaces together for various mailer applications for many years. For example, they are commonly used to temporarily bond a plastic credit card to a sheet of card stock or paper. They can also be used to temporarily bond the edges together of a folded piece of paper as it is transported in the mail. Once the consumer receives the item, it is expected that the folded item can be opened or the credit card be removed without tearing the substrates. If the substrates are porous or cellulosic like paper, staining of the paper is not acceptable.

BACKGROUND OF THE INVENTION

Historically, most removable tack down adhesives that fail adhesively from one of the substrates are formulated with styrenic block copolymers containing hydrogenated midblocks, such as styrene/ethylene-butylene/styrene (SEBS) or styrene/ethylene-propylene/styrene (SEPS) block copolymers. These types of formulations have high oil loading to give easy release and are soft, flexible, and have elastomeric characteristics. These adhesives are used to hold in place mailer items or advertisements and are very suitable for non-porous surface applications like plastic cards, films, foils, etc. However, these types of hot melt formulations are not suitable for porous substrates like paper mailer stock due to oil staining. This is mainly due to the high oil concentration of the adhesive composition and/or the composition of or type of paper stock used. In addition, these types of adhesives have higher modulus and are designed to fail adhesively from one of the substrates. However, with paper mailer stock applications, if the adhesive is not applied properly, the higher modulus of the adhesive can cause tearing of the paper when opening the mailer.

U.S. Pat. Nos. 5,912,295 and 6,433,069, both assigned to H. B. Fuller, describe removable grade hot melt pressure sensitive adhesives used in this type of application. Both are directed at adhesives which fail adhesively from one of the substrates. There is no mention of making a product that fails cohesively and instead they state that the "removable hot melt pressure sensitive adhesives are designed to allow separation of substrates at any time after application of one substrate to another without substrate failure or adhesive transfer." (col. 1, line 32 of '295) There is nothing to suggest the use of a secondary polyolefin polymer which can be used to cause cohesive failure to occur.

U.S. Pat. Nos. 5,741,840 and 6,172,156, both assigned to H. B. Fuller, describe hot melt adhesives which fail cohesively for use in food packaging applications. In this case however, the substrates used are heavy gauge plastic films used for packaging perishable foods. The adhesive bonds strongly to the substrates and fails cohesively when opened. Since the adhesive is pressure sensitive the package can be opened and resealed repeatedly. No mention of staining is made in either of those patents, since the films used would not absorb oil which could cause staining. The hot melts of the present invention also fail cohesively but do not stain porous substrates and are not pressure sensitive adhesives. This requires a completely different formulation approach.

A need exists for a non-pressure sensitive hot melt adhesive which will serve to bond porous substrates together without staining and which will fail cohesively when opened and thereby eliminate tearing of the substrate.

SUMMARY OF THE INVENTION

The present invention relates to a non-pressure sensitive hot melt adhesive for use in mailer applications comprising a styrenic block copolymer (SBC) with a hydrogenated mid-block as the primary polymer in the composition. The adhesive contains about 10% to about 50% by weight of the SBC, about 2% to about 30% by weight of a polyolefin polymer as a secondary polymer in the composition, about 10% to about 70% by weight of a suitable plasticizer, about 0% to about 30% by weight of a wax, about 0% to about 50% by weight of one or more tackifying resins, about 0.1% to about 4% by weight of a stabilizer, and about 0% to about 3% by weight of auxiliary additives, so that the viscosity of the composition is equal to or less than about 10,000 centipoise (cP) at 163° C. The formulation balances the cohesive and adhesive strength required to insure the adhesive fails cohesively to prevent paper tear. In addition, the presence of a secondary polyolefin polymer allows additional oil absorption into the polymer, thus preventing oil from staining the substrates or surfaces at 25° C. (77° F.) up to 71° C. (160° F.) without significantly increasing the viscosity.

DETAILED DESCRIPTION OF THE INVENTION

A wide variety of styrenic block copolymers (SBC) are useful as the primary polymer in the present invention, and are present in an amount of about 10% to about 50% by weight, preferably about 15% to about 40%, and most preferably about 20% to about 30% by weight, in the composition. These SBC polymers include A-B-A triblock structures, A-B diblock structures, (A-B)$_n$ radial block copolymer structures, as well as branched and grafted versions of such, wherein the A endblock is a non-elastomeric polymer block, typically polystyrene, and the B block is an unsaturated conjugated diene or hydrogenated version thereof. In general, the B block is typically isoprene, butadiene, ethylene/butylene (hydrogenated butadiene), ethylene/propylene (hydrogenated isoprene), ethylene-ethylene/propylene (hydrogenated isoprene/butadiene) and mixtures thereof.

There are many different types of styrenic block copolymers available today in the marketplace. They are available in a number of different chemical types and structure types. Examples of the styrenic block copolymers (SBC) that may be used in the present inventive composition include styrene-butadiene (SB), styrene-butadiene-styrene (SBS), styrene-isoprene-styrene (SIS), styrene-isoprene (SI), styrene-isoprene-butadiene-styrene (SIBS), styrene-ethylene-butylene-styrene (SEBS), styrene-ethylene-butylene (SEB), styrene-ethylene-propylene-styrene (SEPS), styrene-ethylene propylene (SEP) and styrene-ethylene-ethylene-propylene-styrene (SEEPS or hydrogenated SIBS).

For purposes of the present invention, it is preferred that the styrene endblocks of the copolymer comprise about 10% to about 40% by weight of the copolymer, the midblocks of the styrenic block copolymer be hydrogenated, and the copolymer have a melt index less than about 30 grams/10 minutes. Preferred SBC polymers are thus styrene-ethylene-butylene-styrene (SEBS), styrene-ethylene-butylene (SEB) styrene-ethylene-propylene-styrene (SEPS), styrene-ethylene-propylene (SEP) and styrene-ethylene-ethylene-propylene-styrene (SEEPS or hydrogenated SIBS). Particularly preferred polymers are the SEBS and SEEPS grades.

Commercial available styrenic block copolymers useful in the present composition include the Kraton G series block copolymers, available from Shell Chemical Company (Houston, Tex.), and Septon 2000, 4000, 8000 grades of block copolymers, available from Kuraray Co. Ltd. Within the range of SEBS polymers, it has been found that those with about 30% styrene have good compatibility in the present composition. Particularly preferred is Kraton G1652M, which is manufactured by Kraton Performance Polymers. This polymer has a styrene content of 29%, a Melt Index (ASTM D1238, 5 kg. 230° C.) of 5 grams/10 minutes, and a diblock content of 0 percent. Other grades that are suitable include Kraton G1650, Kraton G1643 and Kraton G1657.

The adhesive composition of the invention comprises a styrenic block copolymer (SBC) preferably with hydrogenated midblocks such as ethylene/butylene, ethylene/propylene, ethylene-ethylene/propylene, and mixtures thereof as the primary polymer. These block copolymers generally have very high molecular weight, which allows for higher oil loading in the formulation. This allows for soft, flexible, and elastomeric properties, which are required for the paper mailer application to prevent fiber tearing. The molecular weight of a block copolymer relates to its solution viscosity at 25° C. (77° F.) for a given weight percent (usually 25%, 20% or 10% by weight) of the neat polymer concentration in a solvent, usually toluene. The solution viscosity depends on the molecular weight of the block copolymer. The solution viscosity (25% in toluene) of the styrenic block copolymers that are useful in the invention ranges from about 100 cP to about 50,000 cP at 25° C. (77° F.). More preferably the solution viscosity at 25° C. (25% in toluene) is from about 200 cP to about 10,000 cP.

The adhesive composition of the invention also comprises at least one polyolefin polymer as the secondary polymer in an amount of about 2% to about 30% by weight, preferably about 5% to about 20% by weight, and most preferably about 5% to about 15% by weight. Either a single secondary polyolefin polymer may be used, or mixtures of two or more secondary polyolefin polymers may be incorporated into the adhesive composition, depending upon the formulation desired. The secondary polymer is a polyolefin polymer that is different from the other components of the present adhesive composition, i.e. different than the SBC polymer, the plasticizer, the wax, the tackifying resin, the stabilizer, and any auxiliary additive that may be used in the adhesive composition. Typically, a polyolefin polymer useful as the secondary polymer of the present composition will have a viscosity at 190° C. of greater than 1000 centipoise (cP) which thus distinguishes it from other low molecular weight polyolefins such as a polyolefin wax which typically has a viscosity at 190° C. of less than 500 cP. These secondary polymers may be composed of a homopolymer, a copolymer, a terpolymer, or blends of homopolymers, copolymers, or terpolymers. There are various types of polyolefin polymers that are particularly preferred as the secondary polymer in the invention, for example, amorphous poly-alpha olefins (APAO), olefin block copolymers (OBC) which are copolymers of ethylene and octene, and metallocene catalyzed polyolefins comprising homogeneous linear ethylene/alpha-olefin or propylene/alpha-olefin interpolymers. The interpolymer comprises ethylene or propylene and at least one $C_2$-$C_{20}$ alpha-olefin. The term "interpolymer" is used herein to indicate a copolymer, or a terpolymer, or a higher order polymer as described in U.S. Pat. No. 6,582,829, the disclosure of which is specifically incorporated herein by reference.

The density of the secondary polyolefin polymers that are useful in the invention ranges from about 0.850 g/cm$^3$ to about 0.965 g/cm$^3$. To balance the modulus or flexibility and compatibility of the adhesive composition, the preferred density is from about 0.850 g/cm$^3$ to about 0.920 gm/cm$^3$, more preferably from about 0.855 g/cm$^3$ to about 0.910 g/cm$^3$, and most preferably from about 0.860 g/cm$^3$ to about 0.890 g/cm$^3$. The melt index of the secondary polyolefin polymer is preferably greater than about 10 grams/10 minutes at 190° C./2.16 kg using ASTM D-1238. More preferably, the melt index of the secondary polyolefin polymer is greater than about 30 g/10 minutes and most preferably greater than about 100 g/10 minutes.

As noted above, the adhesive composition of the present invention may comprise a polyolefin polymer, or blend of polyolefin polymers, which is a copolymer based on ethylene and a $C_3$ to $C_{20}$ alpha-olefin comonomer, or propylene and a $C_2$ to $C_{20}$-alpha-olefin comonomer, obtained by metallocene-catalyzed polymerization, as the secondary polyolefin polymer. The metallocene catalyzed polyolefin polymer functions to provide the formulation cohesive strength. It does this by providing a substantially linear storage modulus (G') throughout the service temperature range of from 0° C. to 80° C. The metallocene catalyst technology polyolefin polymers useful in the present invention are elastomeric polymers within a larger group of olefins. Olefins are unsaturated hydrocarbons and the most typical monomers used in polyolefins are ethylene and alpha-olefins containing up to twenty carbon atoms. Principle olefin co-monomers include ethylene, propylene, butene, hexene, octene, and combinations thereof. However, for purposes of the present invention, the alpha-olefin comonomer preferably contains 3 to 12 carbon atoms, more preferably contains 4 to 10 carbon atoms, and most preferably contains 4 to 8 carbon atoms. More particularly, the alpha-olefin comonomer may be selected from 1-butene, 1-pentene, 3-methyl-1-butene, 3-methyl-1-pentene, 1-hexene, 4-methyl-1-pentene, 1-dodecene, 3-methyl-1-hexene, 1-octene, and 1-decene. Particularly preferred is 1-butene or 1-octene copolymerized with ethylene.

Polyolefins include ethylene polymers, such as polyethylene, or propylene polymers, such as high and low density polypropylene, and combinations thereof including combinations with other $C_2$-$C_{20}$ alpha-olefin co-monomers. Elastomeric polyolefins typically contain ethylene and propylene, together with $C_2$-$C_{10}$ olefin co-monomer units. Some particularly preferred polyolefin polymers are copolymers of ethylene with at least one other olefin monomer, referred to as "ethylene-based" because the predominant monomer by weight is ethylene such as ethylene-propylene copolymers and ethylene-octene copolymers, or copolymers of propylene and at least one other olefin monomer, referred to as "propylene based" because the predominant monomer is propylene by weight, such as propylene-ethylene copolymers. As noted above, a blend of one or more ethylene-based copolymers, or a blend of one or more propylene-based copolymers, or a blend of one or more ethylene-based copolymers with one or more propylene-based copolymers may be used in the present composition. The alpha-olefin co-monomer content in the ethylene-based copolymer is at least 20% by weight and in the range of from 20% to 50% by weight, preferably from 25% to 50% by weight, more preferably from 30% to 50% by weight. The alpha-olefin co-monomer content in the propylene-based copolymer is at least 5% by weight, preferably 5% to 30% by weight, and most preferably 5% to 20% by weight. The preferred copolymer is a propylene-ethylene copolymer. Although any polymer falling in the range of properties herein described above can be used, preferred polyolefin polymers useful in this invention are available from Dow Chemical Co. under the trade name designation Affinity (metallocene catalyzed ethylene-octene copolymers), or Versify (metallocene catalyzed propylene-based copolymers), or from ExxonMobil Chemical Co. under the trade name designation Vistamaxx (metallocene catalyzed propylene-ethylene copolymers), or from Total Petrochemical under the trade designation EOD, for example EOD-02-15 (which is a metallocene catalyzed polypropylene copolymer), or from Westlake Chemical Company under the trade designation Epolene C-10 (which is a highly branched polyethylene polymer), among others. As noted, about 2% by weight to about 30% by weight, preferably about 5% by weight to about 20% by weight, and most preferably about 5% to about 15% by weight of the metallocene catalyzed polyolefin polymer may be incorporated into the present adhesive composition.

A functionalized metallocene catalyzed polyolefin elastomer may also be employed as the secondary olefin polymer. The term "functionalized" refers to polymers which are chemically modified so as to contain a functional group such as epoxy, silane, sulfonate, amide, and particularly anhydride, on the polymer backbone. Particularly preferred is a metallocene catalyzed polyolefin elastomer grafted with maleic anhydride (MAH) functionality. An example of these MAH grafted metallocene polymers includes Affinity® GA1000R from Dow Chemical Company. This polymer has a density of 0.878 grams/c.c., a DSC melting point of 68° C. and a Glass Transition Temperature of −58° C. via DSC. The Brookfield Viscosity at 177° C. is 13,000 centipoise (cP) and the Melt Index (ASTM 1238 with 190° C., 2.16 kg weight) is about 660 grams/10 minutes.

The APAO component useful as the secondary olefin polymer in the present invention comprises several different categories of atactic, low molecular weight, low melt viscosity, and substantially amorphous homopolymers of propylene or ethylene, or copolymers of propylene or ethylene with an alpha-olefin co-monomer. A blend of one or more APAO polymers may also be used in the present composition. The term "substantially amorphous" is defined herein as having a degree of crystallinity less than 30%, as determined by differential scanning calorimetry (DSC) against a highly crystalline polypropylene standard. These preferred APAO polymers can be either homopolymers of propylene or copolymers of propylene with one or more alpha-olefin co-monomer, such as, for example, ethylene, butene-1, hexene-1 and octene-1. The weight average molecular weight of the APAO polymers in the scope of the present invention is in the range of from about 4,000 to about 150,000 g/mol, preferably from about 10,000 to about 100,000 g/mol. The APAO polymers have advantageously a softening point between about 80 and 170° C. and a glass transition temperature from about −5 to −40° C. Although any APAO polymer falling in the range of physical properties herein described above can be used, the most preferred APAO is selected from the group consisting of propylene homopolymer, propylene-ethylene copolymer, propylene-butene-1 copolymer, propylene-ethylene-butene-1 terpolymer, and butene-propylene copolymers. The APAO polymers of the types herein described above are commercially available from Eastman Chemical Company, Kingsport, Tenn., under the trade name designation Eastoflex or from REXtac, LLC, Houston, Tex., under the trade name designation Rextac or from Degussa Corporation, Passipanny, N.J., under the trade name designation Vestoplast. As noted, about 2% to about 30% by weight APAO may be blended into the adhesive composition, preferably about 5% to about 20% by weight, and most preferably about 5% to about 15% by weight.

As noted above, the secondary olefin polymer component used in the present hot melt adhesive formula according to the present invention may also be an olefin block copolymer (OBC). An "olefin block copolymer" or OBC is a more recent development in the area of polyolefins. This is an entirely new class of polyolefin polymers produced using a chain shuttling catalysis technology that produces a linear block structure of the monomers rather than a random polymer produced by Ziegler-Natta or traditional metallocene technology. At this time, they are manufactured by Dow Chemical under the trade name of Infuse®. The OBC's consist of crystallizable ethylene-octene blocks (hard) with very low co-monomer content and high melting point alternating with amorphous ethylene-octene blocks (soft) with high co-monomer content and low glass transition temperature. This gives the polymer much better elevated temperature resistance and elasticity compared to a typical metallocene random polymer of similar density. These polymers are described in WO 2006/101966 and others assigned to Dow Chemical Co.

Olefin block copolymers should not be considered amorphous poly-alpha-olefins because the polymer architecture is completely different (i.e. block vs. random) and is specifically produced to have crystalline regions. In addition, OBCs are significantly narrower in poly-dispersity than other traditionally used olefins, for example APAOs, which impacts their melt profiles as measured by DSC (Differential Scanning calorimetry). It is these structural differences, in combination with the narrow poly-dispersity of OBCs that provides a hot melt adhesive with improved hot tack, adhesion, and cold temperature flexibility without affecting its overall high temperature resistance.

The OBC copolymer may be incorporated into the composition in amounts of from about 5% to about 30% by weight, preferably from about 5% to about 20% by weight, and most preferably from about 5% to about 15% by weight. Olefin block copolymers (OBCs) are polyolefins with alternating blocks of hard (highly rigid) and soft (highly elastomeric) segments. The block structure of OBCs offers an advantaged performance balance of flexibility and sprayability compared to random polyolefin copolymers. OBC copolymers are commercially available from Dow Chemical Company under the tradename "Infuse®" in different grades which are distinguishable primarily based on their density and weight % crystallinity as follows:

| OBC Grade | Density (g/cm$^3$) | Melt Index (MI) |
|---|---|---|
| Infuse 9817 | 0.877 | 15 |
| Infuse 9807 | 0.866 | 15 |

OBCs are well known in the art. Details of their synthesis and physical properties can be found in, for example, WO 2006/101966, WO 2006/102016, WO 2006/102150, WO 2009/029476 and U.S. Pat. No. 7,524,911, the disclosures of which are specifically incorporated herein by reference. As is known in the art, the density of the OBC is directly related to its crystallinity, i.e. the higher the density the higher the percent crystallinity. OBC's useful in the present hot melt adhesive composition have densities ranging from 0.860 g/cm$^3$ to 0.900 g/cm$^3$ and a melt index of about 10 g/10 minutes to about 1000 g/10 min, preferably about 30 g/10 minutes to about 1000 g/10 minutes, and most preferably about 100 g/10 min. to about 1000 g/10 minutes as measured according to ASTM D1238 at 190° C. with a 2.16 kg weight.

Blends of two or more OBC polymers may also be used. For example, a blend of a first OBC polymer and a second OBC polymer that is different than the first OBC polymer may be employed.

A plasticizer, which is typically liquid, but may also be a solid at ambient temperature, is necessary to the present invention, and is present in an amount of about 10% to about 70% by weight, preferably about 30% to about 70% by weight, more preferably about 50% to about 70% by weight, and most preferably about 60% to about 70% by weight, in the composition. Plasticizers provide fluidity to the adhesive and decrease the viscosity, peel values, glass transition temperatures and cohesive strength. The plasticizers useful herein may include mineral and petroleum based hydrocarbon oils. The oils used are primarily hydrocarbon oils which are low in aromatic content and are paraffinic or naphthenic in character. This invention also contemplates the use of vegetable oils and their derivatives and similar plasticizing liquids.

A suitable plasticizer may be selected from the group which includes the usual plasticizing oils, such as mineral oil, but also olefin oligomers and low molecular weight polymers, as well as vegetable and animal oils and derivatives of such oils. The petroleum derived oils which may be employed are relatively high boiling materials containing only a minor proportion of aromatic hydrocarbons. In this regard, the aromatic hydrocarbons should preferably be less than 30% and more particularly less than 15% of the oil, as measured by the fraction of aromatic carbon atoms. More preferably, the oil may be essentially non-aromatic. The oligomers may be polypropylenes, polybutenes, hydrogenated polyisoprenes, hydrogenated polybutadienes, or the like having average molecular weight between about 350 and about 10,000. Suitable vegetable and animal oils include glycerol esters of the usual fatty acids and polymerization products thereof. Other useful plasticizers can be found in the families of conventional dibenzoate, phosphate, phthalate esters, as well as esters of mono- or polyglycols. Examples of such plasticizers includes, but are not limited to dipropylene glycol dibenzoate, pentaerythritol tetrabenzoate, 2-ethylhexyl diphenyl phosphate, polyethylene glycol 400-di-2-ethylhexonate; butyl benzyl phthalate, dibutyl phthalate and dioctylphthalate. The preferred plasticizers that find usefulness in the present invention are mineral oil and liquid polybutenes having average molecular weight less than 5,000.

The liquid plasticizer serves the purpose of reducing the melt viscosity of the hot melt composition for ease of application, reducing the cohesive strength, and also to plasticize the block copolymer which may increase the tackiness and flexibility of the adhesive composition. Examples of useful plasticizers include Calsol 5550, a naphthenic petroleum based oil available from Calumet Lubricants Co. and Kaydol White Mineral Oil, a paraffinic mineral oil available from Sonneborn, Inc.

The resins used to make SBC-based hot melt adhesives fall into two categories: end-block modifiers and mid-block modifiers. An end-block modifying resin is generally one with enough aromatic character that it only associates with the styrenic end-block domains. If the resin has a softening point higher than styrene, it tends to reinforce the styrene end-block and provide higher temperature resistance to the hot melt adhesive at the cost of higher application temperature and viscosity. These resins associate only with the end-block phase of the adhesive and therefore generally do not contribute to the tack and adhesion of the system. The mid-block modifying resins are tackifiers that associate only with the rubbery block or mid-block and contribute to the tack and adhesion of the system. It is also possible to formulate using a tackifier with compatibility with both the endblocks and midblocks. These materials are useful in balancing the properties of the system.

The selection of a tackifier for a block copolymer generally depends on the composition of the mid-block. Styrene-isoprene-styrene block copolymers are the most readily tackified and are very compatible with a wide variety of resins including aliphatic resins such as straight $C_5$, hydrogenated $C_5$, and hydrogenated $C_9$ tackifiers. They are also compatible with partially hydrogenated $C_5$ and $C_9$ resins, mixed $C_5/C_9$ resins, etc. Styrene-ethylene-butylene-styrene (SEBS) block copolymers have fully saturated mid-blocks which provides very good thermal and color stability but they are more difficult to tackify because the polymers themselves have a higher modulus to begin with. SEBS block copolymers are compatible with many of the same resins listed above.

The tackifying resins or tackifiers which are used in the hot melt adhesives of the present invention are those which extend adhesive properties and improve specific adhesion. As used herein, the term "tackifying resin" includes:

(a) aliphatic and cycloaliphatic petroleum hydrocarbon resins having Ring and Ball softening points of from 10° C. to 160° C., as determined by ASTM method E28-58T, the latter resins resulting from the polymerization of monomers consisting primarily of aliphatic and/or cycloaliphatic olefins and diolefins; also included are the hydrogenated aliphatic and cycloaliphatic petroleum hydrocarbon resins; examples of such commercially available resins based on a C5 olefin fraction of this type are Piccotac 95 tackifying resin sold by Eastman Chemical Company, and Escorez 1310LC sold by ExxonMobil Chemical Company;

(b) Aromatic petroleum hydrocarbon resins and the hydrogenated derivatives thereof;

(c) Aliphatic/aromatic petroleum derived hydrocarbon resins and the hydrogenated or acid functionalized derivatives thereof;

(d) Aromatic modified cycloaliphatic resins and the hydrogenated derivatives thereof;

(e) Polyterpene resins having a softening point of from about 10° C. to about 140° C., the latter polyterpene resins generally resulting from the polymerization of terpene hydrocarbons, such as the mono-terpene known as pinene, in the presence of Friedel-Crafts catalysts at moderately low temperatures; also included are the hydrogenated polyterpene resins;

(f) Copolymers and terpolymers of natural terpenes, e.g. styrene/terpene, alpha-methyl styrene/terpene and vinyl toluene/terpene;

(g) natural and modified rosin such as, for example, gun rosin, wood rosin, tall-oil rosin, distilled rosin, hydrogenated rosin, dimerized rosin and polymerized rosin;

(h) glycerol and pentaerythritol esters of natural and modified rosin, such as, for example, the glycerol ester of pale wood rosin, the glycerol ester of hydrogenated rosin, the glycerol ester of polymerized rosin, the pentaerythritol ester of pale wood rosin, the pentaerythritol ester of hydrogenated rosin, the pentaerythritol ester of tall-oil rosin, and the phenolic modified pentaerythritol ester of rosin; and (i) phenolic-modified terpene resins such as, for example, the resin product resulting from the condensation in an acidic medium of a terpene and a phenol.

Mixtures of two or more of the above described tackifying resins may be required for some formulations. Tackifying resins which are useful for the present invention can perhaps include polar tackifying resins, however, the choice of available polar tackifying resins is limited in view of the fact that many of the polar resins appear only partially compatible with metallocene catalyzed polypropylene copolymers and APAO polymers.

The preferred tackifiers for this invention are $C_5$ resins, mixed $C_5/C_9$ resins and partially or fully hydrogenated $C_5$, $C_9$ and $C_5/C_9$ resins having softening points of at least about 95° C., but preferably less than about 140° C., more preferably less than about 115° C., and most preferably less than about 110° C. These resins are used from about 0% to about 50% by weight of the composition, more preferably from about 0% to about 40% by weight and most preferably from about 0% to about 30% by weight of the composition.

As noted above, tackifying resins which are useful within the scope of the present invention can be selected from any of the nonpolar types, which are commercially available. The most preferred resins are aliphatic petroleum hydrocarbon resins examples of which are based on $C_5$ olefins such as Piccotac 9095 (formerly Hercotac 1148) available from Eastman Chemical Company, Kingsport, Tenn. Most preferred are nonpolar products which are hydrogenated DCPD based or aromatically modified derivatives thereof with softening points above 70° C. Examples of such resins are Escorez 5400 and Escorez 5600 sold by ExxonMobil Chemical Company.

Waxes can be used to reduce the melt viscosity of the hot melt adhesive composition. Although amounts varying from about 0% to 30% by weight may be used in the composition of the present invention, the preferred amounts are between about 5% to about 20% by weight. These waxes can also effect the set-up time and the softening point of the adhesive. Among the useful waxes are:

1. low molecular weight, that is, number average molecular weight (Mn) equal to 500-3000, polyethylene wax having a hardness value, as determined by ASTM method D-1321, of from about 0.1 to 120, and having an ASTM E-28 softening point equal to or less than about 100° C.;
2. petroleum waxes such as paraffin wax having a melting point of from about 50° C. to 80° C. and microcrystalline wax having a melting point of from about 55° C. to 100° C., the latter melting points being determined by ASTM method D127-60;
3. synthetic waxes made by polymerizing carbon monoxide and hydrogen such as Fischer-Tropsch wax; and
4. polyolefin waxes. As used herein, the term "polyolefin wax" refers to those polymeric or long-chain low molecular weight entities comprised of olefinic monomer units. This type of material is commercially available from Honeywell Performance Additives. One example is AC-6 which is a polyethylene homopolymer wax with a Mettler Drop Point (ASTM D-3954) of 106° C., a density of 0.92 g/cc, and a Brookfield viscosity of 375 cP at 140° C. The materials which are preferred for use in the composition of the present invention have a Ring and Ball softening point (ASTM E28) of from about 100° C. to about 170° C. As should be understood, each of these wax diluents is a solid at ambient temperature.

Other substances which include hydrogenated animal, fish and vegetable fats and oils such as hydrogenated tallow, lard, soya oil, cottonseed oil, castor oil, menhadin oil, cod liver oil, and the like, and which are solid at the room temperature by virtue of their being hydrogenated, have also been found to be useful with respect to functioning as a wax diluent equivalent. These hydrogenated materials are often referred to in the adhesive industry as "animal or vegetable waxes".

The present invention may include a stabilizer in an amount of from about 0.1% to about 4% by weight. Preferably from about 0.1% to 3% of a stabilizer is incorporated into the composition. The stabilizers which are useful in the hot melt adhesive compositions of the present invention are incorporated to help protect the polymers noted above, and thereby the total adhesive system, from the effects of thermal and oxidative degradation which normally occurs during the manufacture and application of the adhesive as well as in the ordinary exposure of the final product to the ambient environment. Among the applicable stabilizers are high molecular weight hindered phenols and multifunction phenols, such as sulfur and phosphorous-containing phenols. Hindered phenols are well known to those skilled in the art and may be characterized as phenolic compounds that also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include:

1,3,5-trimethyl-2,4,6-tris(3-5-di-tert-butyl-4-hydroxybenzyl)benzene;
pentaerythritol tetrakis-3(3,5-di-tert-butyl-4-hydroxyphenyl)propionate;
n-octadecyl-3(3,5-di-tert-butyl-4-hydroxyphenyl)propionate;
4,4'-methylenebis(4-methyl-6-tert butylphenol);
2,6-di-tert-butylphenol;
6-(4-hydroxyphenoxy)-2,4-bis(n-octylthio)-1,3,5-triazine;
2,3,6-tris(4-hydroxy-3,5-di-tert-butyl-phenoxy)-1,3,5-triazine;
di-n-octadecyl-3,5-di-tert-butyl-4-hydroxybenzylphosphonate;
2-(n-octylthio)ethyl-3,5-di-tert-butyl-4-hydroxybenzoate; and
sorbitol hexa-3(3,5-di-tert-butyl-4-hydroxy-phenyl)propionate.

Especially preferred as a stabilizer is pentaerythritol tetrakis-3(3,5-di-tert-butyl-4-hydroxyphenol)propionate.

The performance of these stabilizers may be further enhanced by utilizing, in conjunction therewith; (1) synergists such as, for example, thiodipropionate esters and phosphites; and (2) chelating agents and metal deactivators as, for example, ethylenediamenetetraacitic acid, slats thereof, and disalicylalpropylenediimine.

It should be understood that other optional auxiliary additives in amounts of 0% to 3% may be incorporated into the adhesive composition of the present invention in order to modify particular physical properties. These may include, for example, such materials as inert colorants e.g. titanium dioxide, fillers, fluorescent agents, surfactants, other types of polymers, etc. Typical fillers include talc, calcium carbonate, clay silica, mica, wollastonite, feldspar, aluminum silicate, alumina, hydrated alumina, glass microspheres, ceramic microspheres, thermoplastic microspheres, baryte and wood flour.

Lower viscosities allow the adhesive to be applied at lower temperatures, which help prevent heat damage to the substrates. The viscosities of the adhesive compositions are preferably less than about 10,000 cP at about 163° C. (325° F.), more preferably less than about 7,500 cP at about 163° C., and most preferably less than about 5,000 cP at about 163° C.

Staining resistance is generally achieved using adhesive compositions which have a relatively high concentration of polymer or use polymers with very high molecular weight, and/or low concentrations of liquid plasticizer. However, the resulting viscosity, cohesive strength of the adhesive, and elongation are typically higher than desired. These properties are helpful in preventing oil staining but could be detrimental to the fiber tear free characteristics needed for porous paper mailer stock. This invention illustrates the oil staining resistance by using secondary polyolefin polymers and/or additives to help oil absorption/retention within the composition itself without significantly increasing the viscosity and internal strength of the adhesive.

Cohesive failure is the ability of an adhesive to resist internal separation forces. For the mailer applications, it is generally desirable to have about equal amounts of adhesive sticking to both substrates when pulled apart. Adhesive failure on the other hand is the inability of the adhesive to stick to both substrates. That is, the adhesive stays on one substrate and is pulled off the other when the article is opened. This invention illustrates that the fiber tear free characteristics can be achieved by balancing the internal or cohesive strength of the adhesive and elongation at break to make the adhesive cohesively fail. By formulating the adhesive to have a certain cohesive strength, you can have essentially the same opening strength regardless of the substrates involved. Assuming the adhesive bonds well to the substrates, the opening force is determined by the amount of adhesive and area the adhesive is applied over. If you have the same adhesive coverage, the force required to open the mailer will be the same regardless of the substrates used. When using a hot melt pressure sensitive adhesive as in U.S. Pat. Nos. 5,912,295 and 6,433,069, the adhesion and therefore the opening force, will be different for every substrate used. The adhesive peel strength to that particular substrate will dictate the opening force. The application temperature will also have a great influence on the bond strength and therefore the opening force required. Variations like this can easily lead to fiber tear upon opening the mailer. If the adhesive is applied too cool, it may not stick well enough to remain bonded to the mailer, which may result in the mailer opening prematurely. The adhesive could fall off and cause problems with the equipment used to process the mailer or in the sorting equipment used by the post office.

The hot melt adhesive composition can be applied to a substrate using a variety of hot melt application techniques including, e.g., extrusion (e.g., bead applicator), roll coating, and slot nozzle coating. In one application method, the hot melt adhesive composition is extruded through a nozzle onto a substrate and then contacted with a second substrate. As the composition cools, the first substrate forms a bond to the second substrate through the hot melt adhesive composition. In another application method, the hot melt adhesive composition is applied to a roller, transferred from the roller to a first substrate, and then contacted with a second substrate. As the composition cools, the first substrate forms a bond to the second substrate through the hot melt adhesive composition. The hot melt adhesive composition can be applied in a variety of forms including, e.g., a bead, a continuous/discontinuous (e.g., intermittently (e.g., dots and dashes)) pattern, a random pattern, and combinations thereof. Hot melt equipment used for these types of applications are well known and can be obtained from a variety of manufacturers, including Nordson Corporation, ITW Dynatec and Graco, Inc.

Test Procedures

Staining and Fiber Tear Test Method Description: Each mailer stock was folded in half, with the address and/or postage place holder on the outer facing surface. Adhesives were applied based on their recommended application temperatures. Three dots of adhesive, each approximately ⅛ inch in diameter were applied evenly spaced about ½ inch from the edge of the mailer. The open time was as short as possible (1 second), followed by 8 seconds of hand compression. Samples were allowed to set up overnight before being placed in environmental chambers set at 25° C. (77° F.) and 71° C. (160° F.) for a period of 24 hours. Samples were tested immediately after removal from the test chamber for percent fiber tear and staining. The percent fiber tear and staining evaluations were done on a Standard Paper Mailer Stock, Regular Printer paper, Manila paper, Ink-Jet Photo Paper, and a Polyamide film. The paper stock and film substrates are described in Table 8.

Tensile Test Description (ASTM D412): A Tensile Test Method similar to that of ASTM D412, but modified as described hereinafter, was used to determine or predict adhesive characteristics by evaluating the Maximum Force (Stress at Maximum Load), Elongation at Maximum Force (Percent Strain at Maximum Load) and Percent Elongation at Break (Percent Strain at Break). The ultimate or maximum force and percent elongation at break helps determine or predict the mode of failures such as cohesive failure, adhesive failure, and percent fiber tear on porous paper mailer stock.

Tensile Test Method: A silicone mold is used to prepare the samples for the tensile strength and elongation determinations. The molten hot melt composition is poured directly into the silicone mold and allowed to cool to room temperature. However, when the hot melt is still molten, a spatula is drawn over the mold to remove any excess material. After the test composition cools to room temperature, the test specimen is removed from the silicone mold. The test specimen is then conditioned at 72° F. and 50% humidity for a minimum of 24 hours before performing the test. The test itself is performed under the same conditions.

Although the test sample is generally dumbbell-shaped as described in ASTM D412, the opposite ends or tabs of the test sample are not spherical but instead are squares being one inch by one inch in size. The middle of the sample, which is the actual test area, is one half inch wide and one half inch in length. The exact thickness of the sample is measured with a micrometer before testing, since the thickness can vary depending on the viscosity and temperature of the hot melt composition as it is poured into the mold. Generally, the thickness of the test sample will be roughly about 0.25 inches.

The specimen is placed between the jaws of the tensile testing machine which are set so that they are one half inch apart. The grips of the tensile tester completely cover the opposite tab ends, with only the one half inch long middle portion exposed.

The tensile test uses a crosshead speed of two inches per minute. The test is continued until the sample tears apart. The tensile strength is calculated by taking the strength in pounds displayed by the tensile tester multiplied by 2 to account for the width of the test area and divided by the thickness of the sample to determine the tensile strength in pounds per square inch. The elongation of the sample at break and at maximum load is also noted. For each sample, three replicates are run and the results averaged.

EXAMPLES

Several experimental mixes were prepared and tested. They are designated Comparative 1 through 4 in Table 1. These adhesives are based on styrenic block copolymer (SBC) with an ethylene/butylene midblock. The compositions range from about 20% up to about 28% by weight of the SBC polymer, about 25% to about 75% by weight of plasticizer, 0% to about 41% by weight of resin and 0% to about 12% by weight of wax (See Table 1).

TABLE 1

Comparative Mixes

| Supplier | Raw Materials | Comp. 1 | Comp. 2 | Comp. 3 | Comp. 4 |
|---|---|---|---|---|---|
| Various suppliers | Paraffin Wax 150-152° F. | 5.1 | | 12 | |
| Sonneborn, Inc. | Kaydol (oil) | 25.7 | 75.0 | 63.0 | 55.5 |
| Eastman Chemicals | Piccotac 9095 (resin) | 41.2 | | | |
| ExxonMobil Chemical | Escorez 5415 (resin) | | | | 24.3 |
| Kraton Polymers | Kraton G1652M (SBC) | 27.9 | 24.9 | 24.9 | 20.1 |
| Various suppliers | Irganox 1010 (stabilizer) | 0.1 | 0.1 | 0.1 | 0.1 |
| Total (% weight) | | 100 | 100 | 100 | 100 |
| Physical Properties | | | | | |
| R&B Softening Point | | 110° C. | 91° C. | 89° C. | 79° C. |
| Viscosity at 149° C. | | 7450 cP | 1230 cP | 1200 cP | 1000 cP |
| Viscosity at 163° C. | | 4025 cP | 700 cP | 680 cP | 600 cP |

Raw Materials Used in Table 1

Paraffin wax is a commercial material available from a number of suppliers, including ExxonMobil Oil Co. It has a Ring & Ball softening point of approximately 150° F.

Kaydol is a USP grade of white mineral oil available from Sonneborn, Inc.

Piccotac 9095 is an aromatic modified $C_5$ resin with a 94° C. Ring & Ball softening point available from Eastman Chemical Co.

Escorez 5415 is a fully hydrogenated dicyclopentadiene resin with a 115° C. Ring & Ball softening point. It is available from ExxonMobil Chemical Co.

Kraton 1652M is a styrene/ethylene-butylene/styrene block copolymer available from Kraton Polymers. It contains 29% styrene and has a Melt Index of 5 grams/10 minutes using ASTM D-1238 (230° C./5 kg.). It has no diblock content.

Irganox 1010 is a hindered phenolic antioxidant available from BASF Chemicals.

None of the mixes in Table 1 meet the fiber tear free and non-staining characteristics required for a porous paper mailer stock application. Table 2 describes the manner in which oil staining was evaluated by assigning a percentage to the degree of staining and/or bleed through observed on the paper stock. As shown in Table 3, test results showed that Comp 2 had the least fiber tear at about 10% to 30%, but significant staining or oil migration was observed on the paper mailer stock at both test temperatures 25° C. (77° F.) and 71° C. (160° F.). Comp 4 has the second lowest fiber tear at 25% and no oil staining observed at 25° C. (77° F.), but at 71° C. (160° F.) the product showed significant staining and 100% fiber tear (See Tables 2 and 3).

TABLE 2

Staining Evaluation Category

| Percent (%) Staining | Description |
|---|---|
| 0% | No visible staining or bleed through observed. |
| 25% | Minimal staining, barely visible. |
| 50-75% | Visible bleedthrough and staining. |
| 100% | Very pronounced, visible bleedthrough and staining. |

Fiber tear (or substrate destruct) is the percentage of the adhesive bond area covered with fibers once the mailer has been opened.

TABLE 3

Fiber Tear and Oil Staining Evaluation Result on Standard Paper Mailer Stock

| | | Test Temperature | | | |
|---|---|---|---|---|---|
| | | 25° C. (77° F.) | | 71° C. (160° F.) | |
| Adhesive | Application temperature | % Fiber Tear | Staining Remarks | % Fiber Tear | Staining Remarks |
| Comp. 1 | 177° C. (350° F.) | 100 | No stain | 100 | No stain |
| Comp. 2 | 138° C. (280° F.) | 10 | 100% stain | 30 | 100% stain |
| Comp. 3 | 138° C. (280° F.) | 100 | No stain | 70 | 100% stain |
| Comp. 4 | 138° C. (280° F.) | 25 | No stain | 100 | 100% stain |

As shown in Table 4, Comp. 2 has the lowest maximum force (13.1 psi) and a low elongation at break (287%) compared to the other samples. The low maximum force results directly correlate to the fiber tear result in Table 3 in which Comp. 2 has the lowest fiber tear.

Comp. 4 has slightly higher maximum force than Comp. 2, but about 71% higher elongation at break compared to Comp. 2. The higher elongation at break has some effects on the mode of failure between the two products, which directly correlates to the fiber tear results in Table 3 in which Comp. 4 showed higher fiber tear compared to Comp. 2.

Comp. 1 and 3 have significantly higher maximum force (>65 psi) compared to Comp. 2 and 4 (<20 psi). However, the % elongation at break of Comp. 3 is the lowest among the four products. Also, Comp. 1 and 3 have 100% fiber tear at 25° C. (77° F.) but Comp. 3 showed less fiber tear than Comp. 1 at 71° C. (160° F.). Both products (Comp. 1 and 3) have significantly higher fiber tear than Comp. 2 and 4.

The tensile results in Table 4 showed that the high maximum force directly correlates to the fiber tear test results in Table 3. Also, the maximum force of the adhesive has a major effect on the mode of failure over % elongation at break. This invention illustrates the importance of finding the balance between the maximum force and % elongation at break to yield an adhesive that fails cohesively and does not cause tearing of the substrates.

TABLE 4

Tensile Test Results (ASTM D412)

|  | Comp. 1 | Comp. 2 | Comp. 3 | Comp. 4 |
|---|---|---|---|---|
| Stress at Max. Load (psi) | 83.8 | 13.1 | 65.2 | 15.2 |
| % Strain at Max. Load | 587.6 | 267.1 | 169.8 | 467 |
| % Strain at Break | 614.6 | 287.1 | 186.9 | 479 |
| Displacement at Break (in) | 3.1 | 1.4 | 0.9 | 2.4 |

The adhesive compositions in Table 5 include an SEBS polymer between 23.4%-28% by wt., 0%-16.5% by wt. of olefin polymer, 35%-60% by wt. of plasticizer, 0%-26.9% tackifying resin, 10%-29.9% of wax, and less than 2.0% of additives. Example 7 includes secondary polymers which play a major role of attaining a cohesively failing, non-staining hot melt suitable for porous mailer stock applications.

Kaydol is a USP grade of white mineral oil available from Sonneborn, Inc.

Piccotac 9095 is an aromatic modified hydrocarbon resin with a 95° C. softening point. It can be obtained from Eastman Chemical Co.

Kraton G1652M is a styrene/ethylene-butylene/styrene block copolymer available from Kraton Polymers. It contains 29% styrene and has a Melt Index of 5 grams/10 minutes using ASTM D-1238 (230° C./5 kg.). It contains 0% diblock content.

Affinity GA1900 is a metallocene catalyzed ethylene/octene random copolymer available from Dow Chemical Company. It has a Melt Index of approx. 1000 g/10 min using 190° C./2.16 kg. and a density of 0.870 g/cc.

Irganox 1010 is a hindered phenolic antioxidant available from BASF Chemicals.

Of the seven experimental mixes in Table 5, only Ex. 7 showed no oil staining and no fiber tear at 25° C. (77° F.) and 71° C. (160° F.) as shown in Table 6. Also, Ex. 7 is the only formulation with an olefin as the secondary polymer as shown in Table 5. This illustrates that the olefin as the secondary polymer provides a balance between the cohesive strength and elongation that provides an adhesive that fails cohesively when used in porous paper mailer stock applications.

All seven experimental mixes showed no staining at both temperatures 25° C. (77° F.) and 71° C. (160° F.) as shown

TABLE 5

Experimental Formulations

|  | Ex. 1 | Ex. 2 | Ex 3 | Ex. 4 | Ex. 5 | Ex. 6 | Ex. 7 |
|---|---|---|---|---|---|---|---|
| Raw Materials |  |  |  |  |  |  |  |
| Paraffin Wax 150-152° F. | 10 | 15.9 | 16.9 | 16.9 | 19.9 | 19.9 |  |
| Hydrogenated Tallow Gycerides |  |  |  |  |  | 10 |  |
| Epolene C-10 (olefin polymer) |  |  |  |  |  |  | 7.5 |
| Kaydol USP White Mineral Oil | 35 | 40 | 43.0 | 50.0 | 55 | 45 | 60 |
| Piccotac 9095 resin | 26.9 | 16 | 15.0 | 8.0 |  |  |  |
| Kraton G1652M (SBC) | 28 | 28 | 25.0 | 25.0 | 25 | 25 | 23.4 |
| Affinity GA 1900 (olefin polymer) |  |  |  |  |  |  | 9.0 |
| Irganox 1010 (stabilizer) | 0.1 | 0.1 | 0.1 | 0.1 | 0.1 | 0.1 | 0.1 |
| Total (% by Wt.) | 100 | 100 | 100 | 100 | 100 | 100 | 100 |
| Physical Properties |  |  |  |  |  |  |  |
| Viscosity at 149° C. | 5500 cP | 2875 cP | 1600 cP | 1200 cP | 1025 cP | 895 cP | 5650 cP |
| Viscosity at 163° C. |  |  |  |  |  |  | 2300 cP |
| R&B Softening Point | 100° C. | 94° C. | 89° C. | 88° C. | 87° C. | 83° C. | 101° C. |

Raw Materials Used in Table 5

Paraffin wax is a commercial material available from a number of suppliers, including ExxonMobil Oil Co. It has a Ring & Ball softening point of approximately 150° F.

Hydrogenated tallow glycerides are available from Acme-Hardesty Co. It is an off-white flake-like material with a R&B softening point of about 60° C.

Epolene C-10 is a highly branched polyethylene polymer with a Melt Index of approximately 2250 (ASTM D-1238 Condition B) and a density of about 0.906 grams/cc at 25° C. (ASTM D-5). It is available from Westlake Chemical Corporation.

in Table 6. Generally, oil staining on various paper mailers is dependent on the paper composition, porosity, thickness, brightness, opacity and coatings used on the paper. However, non-oil staining hot melt adhesives (HMA) can be achieved through formulation and selection of the most compatible plasticizer with the SBC block copolymer or by using a high molecular weight polymer to allow higher oil retention, and/or by balancing the ratio of plasticizer and polymers in the adhesive composition. Typically, these routes generally give higher viscosity or cohesive strength which negatively affects the fiber tear-free properties and are not suitable for paper mailer stock applications.

Ex. 7 illustrates the role of the olefin polymer as the secondary polymer to balance the maximum force and elongation at break needed to obtain a cohesively failing bond. The olefin polymer also provides additional oil retention and helps prevent oil migration or staining into the paper mailer substrates.

TABLE 6

Fiber Tear and Oil Stain Evaluation Results on Standard Paper Mailer Stock

| | | 25° C. (77° F.) | | 71° C. (160° F.) | |
|---|---|---|---|---|---|
| | Adh. Application Temp | % Fiber Tear | Staining Remarks | % Fiber Tear | Staining Remarks |
| Ex. 1 | 177° C. (350° F.) | 80 | No Stain | 0 | No Stain |
| Ex. 2 | 177° C. (350° F.) | 80 | No Stain | 0 | No Stain |
| Ex. 3 | 135° C. (270° F.) | 70 | No Stain | 0 | No Stain |
| Ex. 4 | 135° C. (270° F.) | 70 | No Stain | 0 | No Stain |
| Ex. 5 | 135° C. (270° F.) | 70 | No Stain | 0 | No Stain |
| Ex. 6 | 135° C. (270° F.) | 70 | No Stain | 0 | No Stain |
| Ex. 7 | 149° C. (300° F.) | 0 | No Stain | 0 | No Stain |

TABLE 7

Tensile Test Results (ASTM D412) on Experimental Mixes

| | Ex. 4 | Ex. 6 | Ex. 7 |
|---|---|---|---|
| Stress at Max. Load (psi) | 86.9 | 130 | 30.6 |
| % Strain at Max. Load | 151.9 | 98.6 | 288.3 |
| % Strain at Break | 188.3 | 128 | 327.1 |
| Displacement at Break (in) | 0.9 | 0.6 | 1.6 |

Ex. 4 and Ex. 6 have 70% fiber tear while Ex. 7 has no fiber tear at 25° C. (77° F.) as shown in Table 6. Tensile testing was run on these three mixes to evaluate their maximum force and % elongation at break as shown in Table 7 and to determine the correlation between the tensile results and the % fiber tear results.

Example 4 and Example 6 illustrate the effects of resins and other modifiers in the tensile properties. These two mixes use the same amount of SBC polymer, but they differ in the amount of resin, plasticizer, and other modifiers in the adhesive composition. Example 6 shows significantly higher maximum force and lower % elongation at break as compared to Example 4 as shown in Table 7. This is mainly due to the effects of the fully hydrogenated animal tallow in the adhesive composition of Example 6 which makes it stiffer.

Example 4 exhibits a maximum force of about 87 psi which is 43 psi lower as compared to Example 6 as shown in Table 6. Both experimental mixes showed similar percent fiber tear as shown in Table 6. These tensile properties indicate that maximum force of about 87 psi is significantly higher than what is required for cohesive-fail characteristics.

Interestingly, the adhesive composition for this invention as illustrated in Ex. 7 showed significantly lower maximum force and higher % elongation at break as compared to Ex. 4 and Ex. 6. These tensile data correlates to the % fiber tear results as shown in Table 6.

Table 9 shows additional experimental mixes that were evaluated to determine the tensile property criteria necessary to obtain a product that fails cohesively. Several different polyolefins are compared along with varying levels of oil and tackifier. The formulations in Table 9 were evaluated for staining and fiber tear on several different types of paper as shown in Tables 10 through 13. The tensile properties of these formulations are shown in Table 14.

Paper mailer stock varies significantly from one type to another. Some of the variables include their base composition, level of porosity, strength, basis weight, water resistance, etc. Coated paper is paper which has been coated by a compound to impart certain qualities to the paper, including weight, surface gloss, brightness, opacity, smoothness, ink absorbency, scuff resistance and a myriad of other properties. Many of these modifications can change the adhesion properties and oil staining characteristics of the hot melt adhesive.

Kaolinite, calcium carbonate, bentonite, talc and many other fillers are used to coat paper for high quality printing used in packaging industry and in magazines. The chalk or clay is bound to the paper with synthetic viscosifiers, such as styrene-butadiene latexes and natural organic binders such as starch. The coating formulation may also contain chemical additives as dispersants or resins, to give water resistance and wet strength to the paper, or to protect against ultraviolet radiation.

Standard coated fine paper or woodfree coated paper (WFC) is mainly produced for offset printing. Standard coated fine paper is a quality paper normally used for advertising materials, books, annual reports and high quality catalogs. Basis weight ranges from 90-170 $g/m^2$ and ISO brightness between 80-96%. The fiber consists of more than 90% chemical pulp. Total pigment content is in the range 30-45%, where calcium carbonate and clay are the most common.

Low coat weight papers have lower coat weights than the standard WFC (3-14 $g/m^2$/side) and the basis weights and pigment content are also generally lower, 55-135 $g/m^2$ and 20-35% respectively.

Standard Printer paper or Standard Coated Office Paper has traditionally been designed for use with typewriters and copy machines, where the paper usually does not get wet. With these types of paper, moisture tends to wick through the fibers away from the point of contact to form a disk. For an inkjet paper, this spreading results in the ink spreading out in the fibers to form a large smudge which lacks pigment intensity. For lower quality printing, uncoated copy paper will suffice, but higher quality grades require coating.

Manila paper is a relatively inexpensive type of paper, generally made through a less refined process than other types of paper. It is typically made from semi-bleached wood fibres. It is not as strong as kraft paper but has better printing qualities. It is quite porous and is generally used at very high basis weights or thickness.

Inkjet paper is a special fine paper designed for inkjet printers, typically classified by its weight, brightness and smoothness, and sometimes by its opacity Inkjet paper is made from high quality deinked pulp or chemical pulps and requires good dimensional stability, no curling or cockling, good surface strength, and surface smoothness. High-quality inkjet printing with dark, crisp lines requires the paper to have exactly the right degree of absorbency to accept the ink but prevent its sideways spread. The traditional coatings are not widely used for inkjet papers. For matte inkjet papers, it is common to use silica as pigment together with polyvinyl alcohol (PVOH). Glossy inkjet papers can be made by multicoating, resin coating, or cast coating on a lamination paper.

Photo paper is a category of inkjet paper designed specifically for reproduction of photographs, which is extremely bright white due to bleaching or substances such as titanium dioxide, and has been coated with a highly absorbent material that limits diffusion of the ink away from the point of contact. Highly refined clay is a common coating to prevent ink spread.

TABLE 8

Paper Stock/Film Description

| Paper/Film Name | Paper/Film Type | Paper/Film Type | Thickness (Mil) |
|---|---|---|---|
| Standard Paper Mailer Stock | Standard Coated Fine Paper | Porous Paper | 9.3 |
| Standard Printer Paper | Standard Coated Office Paper | Porous Paper | 3.8 |
| Manila Paper | Standard Un-coated Paper | Porous Paper | 10.3 |
| H-P Inkjet Photo Paper | Coated Paper | Porous Paper | 4.5 |
| Polyamide Film | Biaxially-oriented nylon (BON) | Non-porous Film | 3.1 | tains 29% styrene and has a Melt Index of 5 grams/10 minutes using ASTM D-1238 (230° C./5 kg.). It contains no diblock.

Irganox 1010 is a hindered phenolic antioxidant available from BASF Chemicals.

As shown in Table 9, Ex. 7 and Ex. 12 illustrate the different types of polyolefins that are useful for this invention. Ex. 7 and Ex. 12 have the same total percentages of secondary polyolefin polymer used, but differ in the olefin composition. Ex. 7 uses 9% by weight Affinity GA 1900 from Dow, which is a metallocene catalyzed ethylene-octene copolymer, and 7.5% by weight Epolene C-10 which is a polyethylene polymer, and Ex. 12 uses 9% by weight Eastoflex E1060 from Eastman Chemicals, which is an amorphous polyalphaolefin (copolymer of propylene and ethylene) and 7.5% by weight Epolene C-10. Ex. 7 through 9 also vary in oil concentration from 60%-69% by weight. Surprisingly, the present inventive compositions can incor-

TABLE 9

Inventive Formulations

|  | Ex. 7 | Ex. 8 | Ex. 9 | Ex. 10 | Ex. 11 | Ex. 12 |
|---|---|---|---|---|---|---|
| Escorez 5600 (resin) |  |  |  | 7.5 |  |  |
| Epolene C-10 (olefin polymer) | 7.5 | 7.5 |  |  |  | 7.5 |
| Paraffin Wax 150-152° F. |  |  |  |  | 7.5 |  |
| Kaydol (oil) | 60.0 | 69.0 | 67.5 | 60.0 | 60.0 | 60.0 |
| Eastoflex 1060 (APAO) |  |  |  |  |  | 9.0 |
| Affinity GA 1900 (olefin polymer) | 9.0 |  | 9.0 | 9.0 | 9.0 |  |
| Kraton G1652M (SBC) | 23.4 | 23.4 | 23.4 | 23.4 | 23.4 | 23.4 |
| Irganox 1010 (stabilizer) | 0.1 | 0.1 | 0.1 | 0.1 | 0.1 | 0.1 |
| Total (% by Wt.) | 100.0 | 100.0 | 100.0 | 100.0 | 100.0 | 100.0 |
| Physical Properties |  |  |  |  |  |  |
| Viscosity at 163° C. | 2300 cP | 815 cP | 930 cP | 1100 cP | 895 cP | 2335 cP |
| Softening Point | 101° C. | 89° C. | 88° C. | 85° C. | 89° C. | 101° C. |

Raw Materials Used in Table 9

Escorez 5600 is a hydrogenated aromatic modified dicyclopentadiene resin with a 100° C. Ring & Ball softening point. It is available from ExxonMobil Chemical Co.

Epolene C-10 is a highly branched polyethylene polymer with a Melt Index of approx. 2250 (ASTM D-1238 Condition B) and a density of about 0.906 grams/cc at 25° C. (ASTM D-5). It is available from Westlake Chemical Corporation.

Paraffin wax is a commercial material available from a number of suppliers, including ExxonMobil Oil Co. It has a Ring & Ball softening point of approx. 150° F.

Kaydol is a USP grade of white mineral oil available from Sonneborn, Inc.

Eastoflex E1060 is an amorphous polyalphaolefin available from Eastman Chemical Co. It is a copolymer of propylene and ethylene with a Ring & Ball softening point of 135° C. (ASTM E28) and a viscosity at 190° C. of 6,000 cP (ASTM D 3236).

Affinity GA1900 is a metallocene catalyzed ethylene/octene random copolymer available from Dow Chemical Company. It has a Melt Index of approx. 1000 g/10 min using 190° C./2.16 kg. and a density of 0.870 g/cc.

Kraton G1652M is a styrene/ethylene-butylene/styrene block copolymer available from Kraton Polymers. It conporate up to about 70% by weight of plasticizer. Normally, hot melt compositions do not contain that much plasticizer. However, for the present application, the use of such high amounts of plasticizer is clearly an advantage since high amounts of plasticizer lowers the viscosity, may help lower the application temperature, and significantly lowers the raw material costs.

As shown in Table 10, Ex. 7-12 all have non-staining characteristics at both temperatures using the Standard Paper Mailer Stock, which is a type of Standard Coated Fine Paper. Also, Ex. 8 and Ex. 9 showed the most staining on Standard Printer Paper at 25° C. (77° F.) and 71° C. (160° F.), shown in Table 11.

As shown in Table 12, all lab mixes have significant oil staining on Ink-Jet Photo Paper stock. These type of paper is coated with highly refined clay or other coating material that limits diffusion of the ink away from the point of contact. Thus, the oil migration or staining is more concentrated and are more visible on Ink-Jet Photo Paper than on Standard Printer Paper.

In Table 13, these mixes did not stain at 25° C. (77° F.) temperature using Manila Paper, but at 71° C. (160° F.), the mixes with higher amounts of oil concentrations, Ex. 8 and Ex. 9, showed 75% oil stains. These results indicate that the most preferred oil or plasticizer concentration is about 70% by weight or less without oil migration or staining on porous mailer stock/substrates.

Therefore, oil staining is very dependent on the type of paper used in addition to the adhesive composition. Those paper that uses high level or inorganic material such as clay, silica or titanium dioxide to increase the brightness or opacity of the paper such as the Ink-jet Photo Paper have more visible oil migration or staining as compared to the other grades of paper, which use lower levels of these types of coatings.

Experimental mixes Ex. 7 and Ex. 12 illustrate different types of polyolefins useful for this invention. Ex. 7 uses Affinity GA 1900 from Dow, which is an metallocene catalyzed ethylene-octene copolymer and Ex. 12 uses Eastoflex E1060 from Eastman Chemicals, which is an APAO. Both mixes have similar maximum force and % elongation at break as shown in Table 14. These tensile values yielded cohesively-fail characteristics. These results indicates that the preferred polyolefin for this invention includes an APAO (copolymers of propylene and ethylene), and a metallocene catalyzed polyolefin.

Ex. 7 through Ex. 12 illustrate the effects of various polymers and combination of polymers used in the adhesive composition. Ex. 11 uses paraffin wax which increased the maximum force by more than 30 psi and decreased the elongation at break compared to Ex. 9. The use of a highly branched polyethylene polymer like Epolene C-10 as shown in Ex. 7 increases the maximum force by about 15 psi but maintains the percent elongation at break compared to Ex. 9. Both mixes showed no fiber tear in all four paper stocks evaluated as shown in Tables 10, 11, 12, and 13.

TABLE 10

Fiber Tear and Oil Stain Evaluation on Standard Paper Mailer Stock

| Adhesive | 25° C. (77° F.) | | 71° C. (160° F.) | |
| --- | --- | --- | --- | --- |
| | % Fiber Tear | Stain | % Fiber Tear | Stain |
| Example 7 | 0 | No stain | 0 | No stain |
| Example 8 | 0 | No stain | 0 | No stain |
| Example 9 | 0 | No stain | 0 | No stain |
| Example 10 | 0 | No stain | 0 | No stain |
| Example 11 | 20 | No stain | 0 | No stain |
| Example 12 | 0 | No stain | 0 | No stain |

TABLE 11

Fiber Tear and Oil Stain Evaluation on Standard Printer Paper

| Adhesive | 25° C. (77° F.) | | 71° C. (160° F.) | |
| --- | --- | --- | --- | --- |
| | % Fiber Tear | Stain | % Fiber Tear | Stain |
| Example 7 | 0 | No stain | 0 | 25% Stain |
| Example 8 | 0 | 25% Stain | 0 | 50-75% Stain |
| Example 9 | 0 | 25% Stain | 0 | 50-75% Stain |
| Example 10 | 0 | No stain | 0 | 25% Stain |
| Example 11 | 0 | No stain | 0 | 25% Stain |
| Example 12 | 0 | No stain | 0 | 25% Stain |

TABLE 12

Fiber Tear and Oil Stain Evaluation on Ink-Jet Photo Paper

| Adhesive | 25° C. (77° F.) | | 71° C. (160° F.) | |
| --- | --- | --- | --- | --- |
| | % Fiber Tear | Stain | % Fiber Tear | Stain |
| Example 7 | 0 | 25% Stain | 0 | 50-75% Stain |
| Example 8 | 0 | 25% Stain | 0 | 50-75% Stain |
| Example 9 | 0 | 25% Stain | 0 | 50-75% Stain |
| Example 10 | 0 | 25% Stain | 0 | 50-75% Stain |
| Example 11 | 0 | 25% Stain | 0 | 50-75% Stain |
| Example 12 | 0 | 25% Stain | 0 | 50-75% Stain |

TABLE 13

Fiber Tear and % Staining Evaluation on Manila Paper

| Adhesive | 25° C. (77° F.) | | 71° C. (160° F.) | |
| --- | --- | --- | --- | --- |
| | % Fiber Tear | Stain | % Fiber Tear | Stain |
| Example 7 | 0 | No stain | 0 | No stain |
| Example 8 | 0 | No stain | 0 | 75% Stain |
| Example 9 | 0 | No stain | 0 | 75% Stain |
| Example 10 | 0 | No stain | 0 | No Stain |
| Example 11 | 0 | No stain | 0 | No stain |
| Example 12 | 0 | No stain | 0 | No stain |

TABLE 14

Tensile Test Results (ASTM D412)

| | Ex. 7 | Ex. 8 | Ex. 9 | Ex. 10 | Ex. 11 | Ex. 12 |
| --- | --- | --- | --- | --- | --- | --- |
| Stress at Max. Load (psi) | 30.6 | 20.2 | 16.5 | 17.5 | 46.3 | 27.4 |
| % Strain at Max. Load | 288.3 | 284 | 264 | 327.5 | 141.9 | 328 |
| % Strain at Break | 327.1 | 314.7 | 287.7 | 343.8 | 168.3 | 350 |
| Displacement at Break (in) | 1.6 | 1.6 | 1.4 | 1.7 | 0.8 | 1.7 |

Testing was also done to evaluate the mode of failure on a non-porous film. The data in Table 15 show Examples 7-12 all had no fiber tear and no staining when tested on polyamide film. These results show that the invention is readily applicable to non-porous substrates, such as a polyamide film.

TABLE 15

Fiber Tear and % Staining Evaluation on Polyamide Film

| Adhesive | 25° C. (77° F.) | | 71° C. (160° F.) | |
| --- | --- | --- | --- | --- |
| | % Fiber Tear | Stain | % Fiber Tear | Stain |
| Example 7 | 0 | No stain | 0 | No stain |
| Example 8 | 0 | No stain | 0 | No stain |
| Example 9 | 0 | No stain | 0 | No stain |
| Example 10 | 0 | No stain | 0 | No stain |
| Example 11 | 0 | No stain | 0 | No stain |
| Example 12 | 0 | No stain | 0 | No stain |

Further study was conducted to determine the % fiber tear and non-staining characteristics at temperatures lower than 25° C. (77° F.). Example 7 showed no oil stain was observed down to −18° C. (0° F.) temperature, and no fiber tear was observed at temperatures over 10° C. (50° F.).

TABLE 16

Fiber Tear and Staining Evaluation on Standard Paper Mailer Stock below 77° F.

| Example 7 | Avg. % Fiber Tear | Stain |
|---|---|---|
| 0° F. (−18° C.) | 100 | No Stain |
| 10° F. (−12° C.) | 100 | No Stain |
| 20° F. (−7° C.) | 100 | No Stain |
| 35° F. (2° C.) | 100 | No Stain |
| 40° F. (4° C.) | 10 | No Stain |
| 50° F. (10° C.) | 0 | No Stain |
| 60° F. (16° C.) | 0 | No Stain |
| 77° F. (25° C.) | 0 | No Stain |
| 160° F. (71° C.) | 0 | No Stain |

The adhesive composition useful in the method of the present invention may be produced using any of the techniques known in the art. A representative example of the procedure involves placing all of the liquid substances in a jacketed mixing kettle and preferably in a jacketed heavy duty mixer of the Baker-Perkins or Day type, and which is equipped with rotors, and thereafter raising the temperature of this mixture to a range of 120° C. to 177° C. The solid tackifying resins and other additives are then added and melted to form a homogeneous mixture. Finally, the polymer is added and mixed until completely blended in. It should be understood that the precise temperature to be used in this step would depend on the melting point of the particular ingredients and the viscosity of the finished adhesive. The resulting adhesive composition is agitated until the polymers completely dissolve. A vacuum is then applied to remove any entrapped air. The finished adhesive is then packaged in the appropriate form.

From the data presented in Tables 7 and 14, it is apparent that in order to prevent tearing of the substrate the tensile strength of the composition should be less than 80 psi, preferably less than 70 psi, more preferably less than 60 psi and most preferably less than 50 psi. The desired tensile strength depends to a degree upon the substrate on which the hot melt composition is applied.

The invention claimed is:

1. A hot melt adhesive composition, comprising a blend of the following components:
   a) about 10% to about 50% by weight of a primary polymer comprising a styrenic block copolymer with a hydrogenated mid-block;
   b) about 2% to about 30% by weight of a secondary polyolefin polymer, said secondary polymer selected from the group consisting of a random polyolefin polymer, an amorphous poly-alpha-olefin (APAO), and mixtures thereof, and having a density from about 0.850 g/cm$^3$ to about 0.965 g/cm$^3$, and a melt index equal or greater than 10 grams/10 minutes at 190° C./2.16 kg;
   c) about 30% to about 70% by weight of a solid or liquid plasticizer;
   d) 0% to about 30% by weight of a wax;
   e) 0% to about 50% of a tackifying resin having a softening point of at least about 95° C.;
   f) about 0.1% to about 4% by weight of a stabilizer;
   g) 0% to about 3% by weight of auxiliary additives;
   wherein the components total 100% by weight of the composition, and the viscosity of the composition is equal to or less than about 10,000 cP at 163° C., wherein the adhesive composition does not contain an olefin block copolymer.

2. The composition of claim 1 wherein said styrenic block copolymer comprises about 15% to about 40% by weight of the composition.

3. The composition of claim 1 wherein said styrenic block copolymer comprises about 20% to about 30% by weight of the composition.

4. The composition of claim 1 wherein said styrenic block copolymer has styrene endblocks of about 10% to about 40% by weight, and a melt index less than 30 grams/10 minutes at 230° C./5 kg.

5. The composition of claim 1 wherein said styrenic block copolymer is selected from the group consisting of styrene-ethylene-butylene (SEB), styrene-ethylene-butylene-styrene (SEBS), styrene-ethylene-propylene (SEP), styrene-ethylene-propylene-styrene (SEPS), and Styrene-ethylene-ethylene-propylene-styrene (SEEPS).

6. The composition of claim 1 wherein the secondary olefin polymer comprises about 5% to about 20% by weight of the composition.

7. The composition of claim 1 wherein the secondary olefin polymer comprises about 5% to about 15% by weight of the composition.

8. The composition of claim 1 wherein said secondary olefin polymer has a density from about 0.855 g/cm$^3$ to about 0.910 g/cm$^3$, and a melt index greater than about 100 g/10 minutes at 190° C./2.16 kg.

9. The composition of claim 1 wherein said secondary olefin polymer comprises the random polyolefin polymer and the random polyolefin polymer comprises a copolymer of ethylene and a $C_3$ to $C_{20}$ alpha-olefin.

10. The composition of claim 1 wherein said secondary olefin polymer comprises the random polyolefin polymer and the random polyolefin polymer comprises a copolymer of propylene and a $C_2$ to $C_{20}$ alpha-olefin.

11. The composition of claim 1 wherein said secondary polyolefin polymer comprises the amorphous poly-alpha-olefin (APAO).

12. The composition of claim 11 wherein said amorphous poly-alpha-olefin is a homopolymer of propylene or a copolymer of propylene with one or more alpha-olefin co-monomer.

13. The composition of claim 1 wherein said plasticizer is selected from the group consisting of naphthenic oils, paraffinic oils and mineral oils.

14. The composition of claim 1 wherein said plasticizer comprises about 50% to about 70% by weight of said composition.

15. The composition of claim 1 wherein said plasticizer comprises about 60% to about 70% by weight of said composition.

16. The composition of claim 1 wherein said wax is selected from the group consisting of a paraffin wax, a microcrystalline wax, a synthetic wax, and a polyolefin wax.

17. The composition of claim 1 wherein said composition has a viscosity less than 5,000 cP at 163° C.

18. An article comprising a mailer stock and the adhesive composition of claim 1.

19. The article of claim 18 wherein said mailer stock is comprised of standard paper mailer stock, regular printer paper, manila paper, ink jet photo paper or a polyamide film.

20. The composition of claim 1 wherein said styrenic block copolymer comprises about 23% to about 50% by weight of the composition.

21. The composition of claim 20 wherein said styrenic block copolymer comprises about 23.4% to about 50% by weight of the composition.

22. The composition of claim 1 wherein said plasticizer is liquid at ambient temperature.

23. The composition of claim 1 wherein said plasticizer comprises about 35% to about 70% by weight of said composition.

* * * * *